United States Patent
Svensson

(10) Patent No.: US 9,797,531 B2
(45) Date of Patent: Oct. 24, 2017

(54) SECURING ASSEMBLY FOR SCREWED HOSE END CONNECTORS

(75) Inventor: Adrian N Svensson, Maidenhead (GB)

(73) Assignee: AKER SOLUTIONS LIMITED, London (GB)

( * ) Notice: Subject to any disclaimer, the term of this patent is extended or adjusted under 35 U.S.C. 154(b) by 10 days.

(21) Appl. No.: 13/814,548

(22) PCT Filed: Aug. 5, 2011

(86) PCT No.: PCT/GB2011/001171
§ 371 (c)(1),
(2), (4) Date: Feb. 25, 2013

(87) PCT Pub. No.: WO2012/020213
PCT Pub. Date: Feb. 16, 2012

(65) Prior Publication Data
US 2013/0140809 A1    Jun. 6, 2013

(30) Foreign Application Priority Data

Aug. 13, 2010 (GB) .................................. 1013595.2

(51) Int. Cl.
*F16L 19/02* (2006.01)
*F16L 33/28* (2006.01)
*F16L 19/00* (2006.01)

(52) U.S. Cl.
CPC .............. *F16L 19/02* (2013.01); *F16L 19/005* (2013.01); *F16L 33/28* (2013.01)

(58) Field of Classification Search
CPC ......... F16L 19/005; F16L 33/28; F16L 33/24; F16L 23/04; F16L 23/032; F16L 23/12;
(Continued)

(56) References Cited

U.S. PATENT DOCUMENTS

| 4,136,896 A | * | 1/1979 | Rodman | F01D 1/28 285/341 |
| 4,655,482 A | | 4/1987 | Myers et al. | |

(Continued)

FOREIGN PATENT DOCUMENTS

| DE | 3528360 A1 | 2/1987 |
| EP | 0 786 617 | 7/1997 |

(Continued)

OTHER PUBLICATIONS

International Search Report for PCT/GB2011/001171, dated Nov. 7, 2011.

(Continued)

*Primary Examiner* — Gregory J Binda
*Assistant Examiner* — Zachary Dragicevich
(74) *Attorney, Agent, or Firm* — Nixon & Vanderhye P.C.

(57) ABSTRACT

A screwed end connector assembly includes a threaded connector having a conical end portion for the reception of a mating hose fitting. The connector has a flange which includes at least one arcuate, circumferentially extending slot. A nut for threaded engagement with the connector, for securing a hose end fitting to the conical portion of the connector, has a polygonal exterior. A member has an aperture for fitment over and irrotational engagement with the exterior of the nut and includes at least one hole positionable in axial register with the said slot.

10 Claims, 2 Drawing Sheets

(58) Field of Classification Search
CPC ....... F16L 37/124; F16L 19/02; Y10T 403/64; Y10T 403/642; Y10T 403/645; Y10T 403/7039; F16B 39/10
USPC ............... 285/412, 414, 89, 90, 82, 354, 80; 411/119, 120
See application file for complete search history.

(56) References Cited

U.S. PATENT DOCUMENTS

| | | | |
|---|---|---|---|
| 5,127,679 A * | 7/1992 | Pouplier | 285/92 |
| 5,222,768 A | 6/1993 | Hofer et al. | |
| 5,882,044 A | 3/1999 | Sloane | |
| 6,050,614 A * | 4/2000 | Kirkpatrick | 285/368 |
| 6,135,509 A * | 10/2000 | Billington, III | 285/92 |
| 6,293,595 B1 * | 9/2001 | Marc et al. | 285/92 |
| 6,652,006 B1 * | 11/2003 | Digiacomo | 285/92 |
| 7,083,120 B2 * | 8/2006 | Gilpatrick et al. | 239/397 |
| 7,600,789 B2 | 10/2009 | Vyse et al. | |
| 7,731,463 B2 * | 6/2010 | Davis | F16B 39/10 411/119 |
| 2004/0017077 A1 | 1/2004 | Vyse et al. | |

FOREIGN PATENT DOCUMENTS

| | | |
|---|---|---|
| FR | 2606119 A1 | 5/1988 |
| GB | 347 639 | 4/1931 |

OTHER PUBLICATIONS

Written Opinion for PCT/GB2011/001171, dated Nov. 7, 2011.
UK Search report dated Nov. 29, 2010 in GB1013595.2.

\* cited by examiner

SECURING ASSEMBLY FOR SCREWED HOSE END CONNECTORS

This application is the U.S. national phase of International Application No. PCT/GB2011/001171 filed 5 Aug. 2011 which designated the U.S. and claims priority to GB Application No. 1013595.2 filed 13 Aug. 2010, the entire contents of each of which are hereby incorporated by reference.

TECHNICAL FIELD

This invention relates to screwed end connectors such as 'JIC' connectors.

BACKGROUND

Screwed end connectors typically comprise a hollow male connector which has a conical end surface for receiving the mating hose swivel fitting. The conical angle is typically 37° but other conical angles are known and used. The connector has a screw threading for engagement by a nut which forces a sealing engagement between the conical end of the connector and the mating hose swivel fitting. These end connectors have been in use for many years.

The present exemplary embodiment particularly concerns a device which is intended to inhibit the unscrewing hose and connector assembly.

The state of the art may be represented by the documents DE 3528360 A1, FR 2606 119 A1, US 2004/0017077 A1 and U.S. Pat. No. 7,600,789 B2.

BRIEF SUMMARY

According to an exemplary embodiment, a screwed end connector assembly comprises a threaded connector having a conical end portion for the reception of a mating hose fitting, the connector having a flange which includes at least one arcuate, circumferentially extending slot; a nut for threaded engagement with the connector, for securing a hose end fitting to the conical portion of the connector; the nut having a polygonal exterior; and a member having an aperture for fitment over and irrotational engagement with the exterior of the nut and including at least one hole positionable in axial register with the said slot.

One example of the invention will be described with reference to the accompanying drawings.

DETAILED DESCRIPTION OF EXAMPLE EMBODIMENTS

Figure 1:
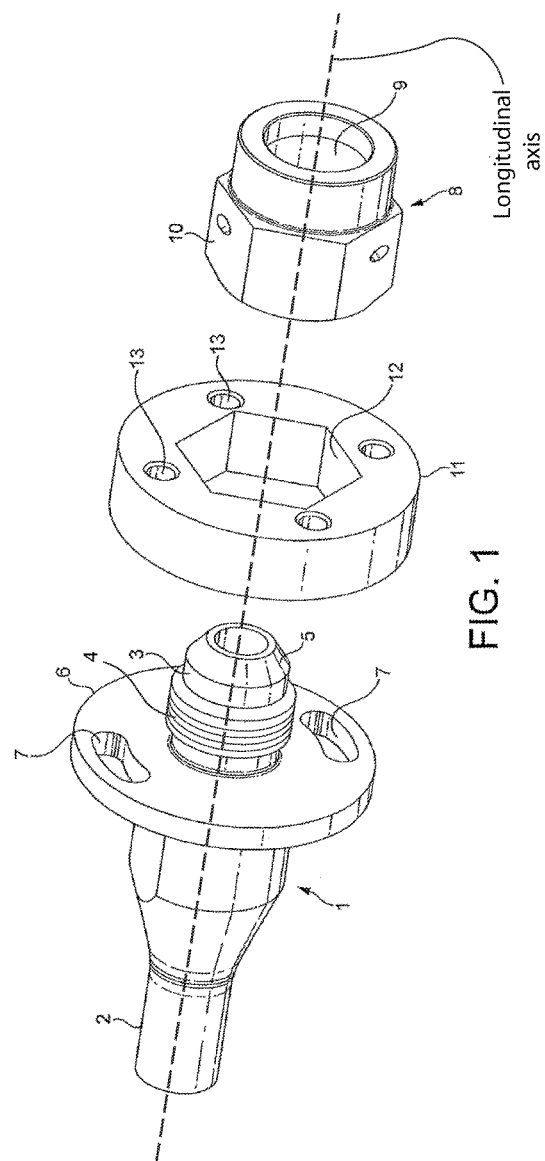
FIG. 1 is a perspective view of the various parts of one embodiment of a JIG screwed end hose connector assembly.

In FIG. 1 are shown the three principal parts of a connector assembly.

The first part 1 is a 'male' connector which has a pipe section 2 terminating in a hollow shank 3 which carries an external screw-threading 4. The end portion 5 of the shank is conical so that it can receive and seal with the mating connector (not shown).

The connector 1 has between the pipe end 2 and the screw-threading 4 a flange 6 extending laterally of the shank 3. The flange has at least two, and preferably more than two, arcuate slots 7. Each such slot 7 is radially concentric, and preferably equally spaced, with respect to the longitudinal axis of the connector 1.

The second component of the assembly is a hollow nut 8 which is fitted to the swivel hose fitting and has an internal thread (not shown) by which the nut can be screwed onto the screw-threading 4, so as to force the hose fitting into sealing engagement with the conical end portion 5 of the connector 1. The outside 10 of the nut 8 is polygonal, usually hexagonal, though other polygonal shapes may be employed.

The third main component of the assembly is a member 11, which may be in the form of a disc as shown, of the same outside diameter as the (circular) flange 6, and which fits irrotationally over the polygonal exterior 9 of the nut 8. For this purpose the member has in this example a central aperture 12 conforming in shape to the exterior of the nut. The member 11 has an array of holes 13 which extend in an axial direction through the member 11. The holes may be threaded. In this example there are four small circular holes 13 but other numbers of holes may be provided. Each hole 13 needs to be at positioned at substantially the same radial distance from the axis of the connector as are the slots 7 in the flange 6.

Figure 2:
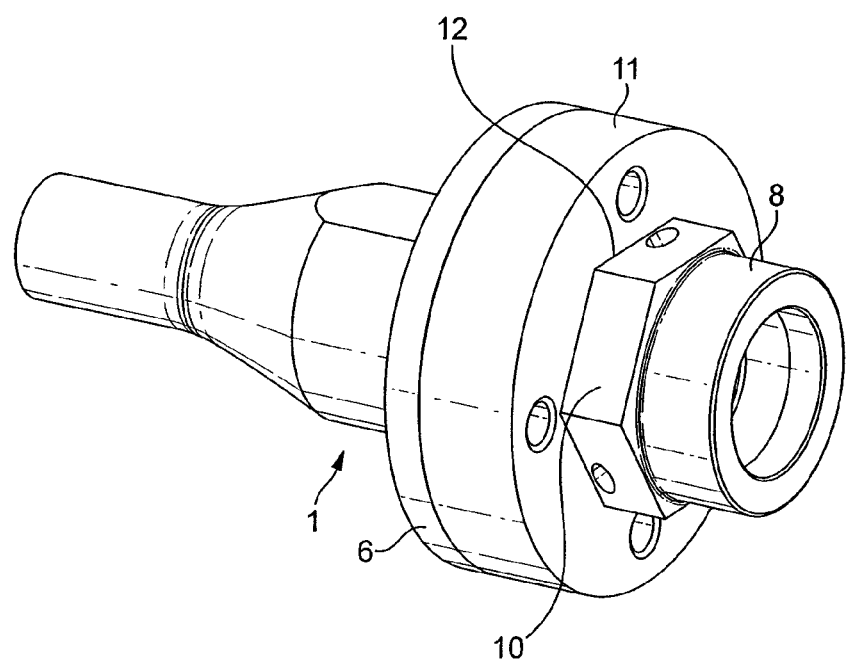
FIG. 2 is a perspective view of the embodiment when fully assembled

FIG. 2 shows the main parts assembled together, the member 11 fitting over the nut 8 which is screw-fitted to the connector 1. The member 11, in this embodiment, abuts the flange 6 directly.

The parts 1, 8 and 11 may be secured against rotation by any suitable means which pass through a hole 13 and one of the slots 7. Typically such means may be a bolt secured by applying a pre-determined torque value and an anaerobic thread locking compound. Other means such as locking nuts, pins or rivets may be employed if suitable.

Preferably the circumferential extent of the slots 7 and the number of holes 13 is such that the member 11 and the flange 7, and thereby the nut 8 and the connector 1, can be secured against mutual rotation at any angular position of the nut on the connector, i.e. such that at least one aperture is in (axial) register with one of the slots. Thus the nut 8 may be tightened to any desired torque setting and secured at that setting.

The invention claimed is:

1. A screwed end connector assembly comprising:
 a male-threaded connector having a conical end portion for the reception of a mating hose fitting, the connector having a radially extending flange permanently affixed thereto between a pipe section portion and said male-threaded conical end portion, which flange extends radially beyond said pipe section portion and said male-threaded portion, said flange including at least one of (a) an arcuate, circumferentially extending, slot or (b) a hole;
 a nut configured for threaded engagement with the threaded connector to secure a hose end fitting to the conical portion of the connector; the nut having a polygonal exterior and a female-threaded interior; and
 a separable collar member having an aperture for fitment over and irrotational engagement with the polygonal exterior of the nut and including at least one of (a) a hole positionable in longitudinal axial register with said at least one slot in said flange or (b) an arcuate, circumferentially extending, slot positionable in longitudinal axial register with said at least one hole in said flanges, said slot(s) and hole(s) being configured to align and accept a rigid elongated fastening member therein to secure said collar member to said flange at an arbitrary corresponding rotational position of the nut thereby also restraining said nut from further rotational movement with respect to said threaded connector.

2. An assembly according to claim 1 in which the aperture is a central polygonal aperture conforming in shape to that of the polygonal exterior of the nut.

3. An assembly according to claim 2 in which the flange includes multiple slots and the said collar member has multiple holes all equally spaced from a longitudinal axis of the connector.

4. An assembly according to claim 3 in which the slots and holes are such that, for any arbitrary angular position of the nut relative to the connector, at least one hole is in register with a slot.

5. An assembly according to claim 3 wherein said flange has multiple slots and said collar has multiple holes and said holes are threaded.

6. An assembly according to claim 1 wherein said at least one hole in the flange and/or collar is threaded.

7. A securing assembly for screwed hose end connectors, said assembly comprising:
(a) an axially-extended threaded connector having in succession on its exterior surfaces, (i) a conical end portion, (ii) a male-threaded portion, (iii) a permanently affixed radially extending flange having at least one slot or hole therein, and (iv) flat surfaces each extending axially along a position disposed radially inwardly of said flange;
(b) a nut having (i) one end configured to capture a swivel hose fitting there-within, (ii) internal female threads at an opposite end configured to engage said male-threaded portion of the connector, and (iii) a polygonal exterior surface; and
(c) a separate collar member having an aperture configured to fit irrotationally over the polygonal exterior of the nut and extending in a radial direction with at least one hole or slot therein configured to mate, respectively, with said at least one slot or hole in the radially extending flange of the connector so that a rigid elongated fastener received within a hole and slot in the collar member and the flange secures said collar member to said flange at an arbitrary rotational position of the nut thereby restraining the nut from further rotational movement with respect to the threaded connector.

8. An assembly according to claim 7 wherein said at least one hole in the flange and/or collar is threaded.

9. An assembly according to claim 7 wherein said flange has multiple slots and said collar has multiple holes and said holes are threaded.

10. A screwed end connector assembly comprising:
a connector member having, in sequence towards an open end, (i) opposed wrench-engaging external surfaces, (ii) a permanently affixed radially-outwardly extending flange having plural spaced-apart slots or holes therein, (iii) external male threads, and (iv) a conical end;
a nut member having internal female threads which mate with the external male threads of the connector member, opposed wrench-engaging external surfaces and an interior configured to capture a swivel hose fitting therein that mates with said conical end of the connector when the female threads of the nut member are screwed onto the external male threads of the connector; and
a radially-outwardly extending collar member having an interior aperture configured to irrotationally fit and slide over the wrench-engaging external surfaces of the nut member, said collar member having plural spaced-apart holes or slots therein which align with the slots or holes of the flange of the connector member when the collar member aperture is fitted and slid over the nut member into contact with the flange,
wherein if the flange has slots, the collar member has holes and if the flange has holes, the collar member has slots, and the holes are threaded for an elongated fastening member to engage and secure the collar member to the flange at any relative rotational position of a tightened connection between the male and female threads.

* * * * *